United States Patent
Andriantsiferana et al.

(10) Patent No.: US 7,917,627 B1
(45) Date of Patent: Mar. 29, 2011

(54) SYSTEM AND METHOD FOR PROVIDING SECURITY IN A NETWORK ENVIRONMENT

(75) Inventors: Laurent H. Andriantsiferana, Valbonne (FR); Jayaraman R. Iyer, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1034 days.

(21) Appl. No.: 10/890,450

(22) Filed: Jul. 12, 2004

(51) Int. Cl.
*G06F 15/16* (2006.01)

(52) U.S. Cl. .................................. 709/227; 370/395.52

(58) Field of Classification Search ................. 709/201, 709/217, 218, 223, 225, 226, 227, 232, 248, 709/249; 726/2, 3, 11, 12, 13; 370/231, 370/395.52

See application file for complete search history.

(56) References Cited

U.S. PATENT DOCUMENTS

| | | | |
|---|---|---|---|
| 4,857,912 A | 8/1989 | Everett, Jr. et al. | 340/825.3 |
| 5,511,122 A | 4/1996 | Atkinson | 380/25 |
| 5,892,903 A | 4/1999 | Klaus | 395/187.01 |
| 5,937,159 A | 8/1999 | Meyers et al. | 395/187.01 |
| 6,061,798 A | 5/2000 | Coley et al. | 713/201 |
| 6,202,081 B1 * | 3/2001 | Naudus | 709/200 |
| 6,253,337 B1 | 6/2001 | Maloney et al. | 714/38 |
| 6,256,773 B1 | 7/2001 | Bowman-Amuah | 717/1 |
| 6,304,262 B1 | 10/2001 | Maloney et al. | 345/418 |
| 6,304,973 B1 | 10/2001 | Williams | 713/201 |
| 6,321,336 B1 | 11/2001 | Applegate et al. | 713/201 |
| 6,370,573 B1 | 4/2002 | Bowman-Amuah | 709/223 |
| 6,452,915 B1 | 9/2002 | Jorgensen | 370/338 |
| 6,519,703 B1 | 2/2003 | Joyce | 713/201 |
| 6,536,037 B1 | 3/2003 | Guheen et al. | 717/151 |
| 6,549,208 B2 | 4/2003 | Maloney et al. | 345/473 |
| 6,550,012 B1 | 4/2003 | Villa et al. | 713/201 |
| 6,606,744 B1 | 8/2003 | Mikurak | 717/174 |
| 6,615,166 B1 | 9/2003 | Guheen et al. | 703/27 |
| 6,650,620 B1 * | 11/2003 | Neogi | 370/231 |
| 6,665,718 B1 * | 12/2003 | Chuah et al. | 709/225 |
| 6,760,046 B2 * | 7/2004 | I'Anson et al. | 715/746 |
| 6,977,917 B2 * | 12/2005 | Skog et al. | 370/349 |
| 6,981,062 B2 * | 12/2005 | Suryanarayana | 709/248 |
| 7,177,043 B2 * | 2/2007 | Qiao | 358/1.15 |
| 7,212,527 B2 * | 5/2007 | Shah et al | 370/389 |
| 7,478,156 B1 * | 1/2009 | Pereira | 709/224 |
| 2002/0078190 A1 * | 6/2002 | Ullmann | 709/223 |
| 2002/0104022 A1 * | 8/2002 | Jorgenson | 713/201 |
| 2003/0120816 A1 * | 6/2003 | Berthaud et al. | 709/248 |

* cited by examiner

*Primary Examiner* — Saleh Najjar
*Assistant Examiner* — Marie Georges Henry
(74) *Attorney, Agent, or Firm* — Baker Botts L.L.P.

(57) ABSTRACT

A method for providing security in a network environment is provided that includes receiving a flow that propagates through an access gateway, the flow being initiated by an end user associated with the flow and propagating through a network. Internet protocol (IP) address information may be gleaned from the flow at a network element. The method further includes recognizing a selected one of the end user being connected to the network and the end user being disconnected from the network such that the IP address information in the access gateway and the network element is substantially synchronized.

21 Claims, 2 Drawing Sheets

SYSTEM AND METHOD FOR PROVIDING SECURITY IN A NETWORK ENVIRONMENT

TECHNICAL FIELD OF THE INVENTION

This invention relates in general to the field of communications and, more particularly, to a system and method for providing security in a network environment.

BACKGROUND OF THE INVENTION

Networking architectures have grown increasingly complex in communications environments. In addition, the augmentation of clients or end users wishing to communicate in a network environment has caused many networking configurations and systems to respond by adding elements to accommodate the increase in networking traffic. Communication tunnels or links may be used in order to establish or to gain access to a network, whereby an end user or an object may initiate a tunneling protocol by invoking a selected location or a network node. The network node or selected location may then provide a platform that the end user may use to conduct a communication session.

As a packet traverses the network through a given communication tunnel, certain network elements track or monitor its behavior (e.g. start and stop times), path (e.g. destination and source), and any other relevant parameters. However, not every network element follows each packet's actions this closely. Thus, some network elements are not aware that certain actions are occurring. At any given point in time during normal network communications, an internet protocol (IP) address of an end user may be left unassigned (e.g. after the end user has been disconnected from the network) or reassigned to a next end user seeking to initiate a new communication session. This lapse allows a given IP to be left unattended for a brief time period, whereby certain network elements are unaware of this issue. This time gap may create a security concern or an integrity issue because malicious traffic may be propagating in the network. For example, a hacker may attempt to break into a communication session or to attack a given network device using an IP address that was vulnerable. Hackers may also use other strategies or techniques in order to pierce network security, corrupt network communications, infiltrate network participants, or compromise the integrity of network accounting and billing.

SUMMARY OF THE INVENTION

From the foregoing, it may be appreciated by those skilled in the art that a need has arisen for an improved communications approach that provides for better security in a network environment. In accordance with one embodiment of the present invention, a system and method for providing better security in a network environment are offered that greatly reduce disadvantages and problems associated with conventional network security techniques.

According to one embodiment of the present invention, there is provided a method for providing security in a network environment that includes receiving a flow that propagates through an access gateway, the flow being initiated by an end user associated with the flow and propagating through a network. Internet protocol (IP) address information may be gleaned from the flow at a network element. The method further includes recognizing a selected one of the end user being connected to the network and the end user being disconnected from the network such that the IP address information in the access gateway and the network element is substantially synchronized.

Certain embodiments of the present invention may provide a number of technical advantages. For example, according to one embodiment of the present invention a communications approach is provided that allows for enhanced network security. The proffered architecture enables complete synchronization of an access gateway and a network element (e.g. a firewall), allowing enhanced security for an Internet protocol (IP) address propagating in the network. The configuration addresses a time gap in network security by allowing a network element to immediately synchronize session state information once an end user is disconnected from the given network. Note that such a security issue is even more problematic in a wireless environment where multiple end users are constantly being rotated on and off the network. The provided architecture may capitalize on the knowledge of access gateways, which can keep track of any events involving an end user. The events, as they occur, may be communicated to a network element such that its internal table can be immediately updated. This avoids a situation where the network element is idle for a period of time or maintains outdated (even by a matter of seconds) information that is has stored about the implicated IP address, sessions, or flows.

Another technical advantage associated with one embodiment of the present invention is a result of its configuration. The configuration is 'protocol independent' and, therefore, can be readily leveraged with existing protocols. Moreover, such an architecture provides for dynamic security without any user-initiated packets to be sent. In addition, such a configuration can be extended to cover any access gateways in any networking architecture or arrangement. Certain embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF EXAMPLE EMBODIMENTS OF THE INVENTION

Figure 1A:
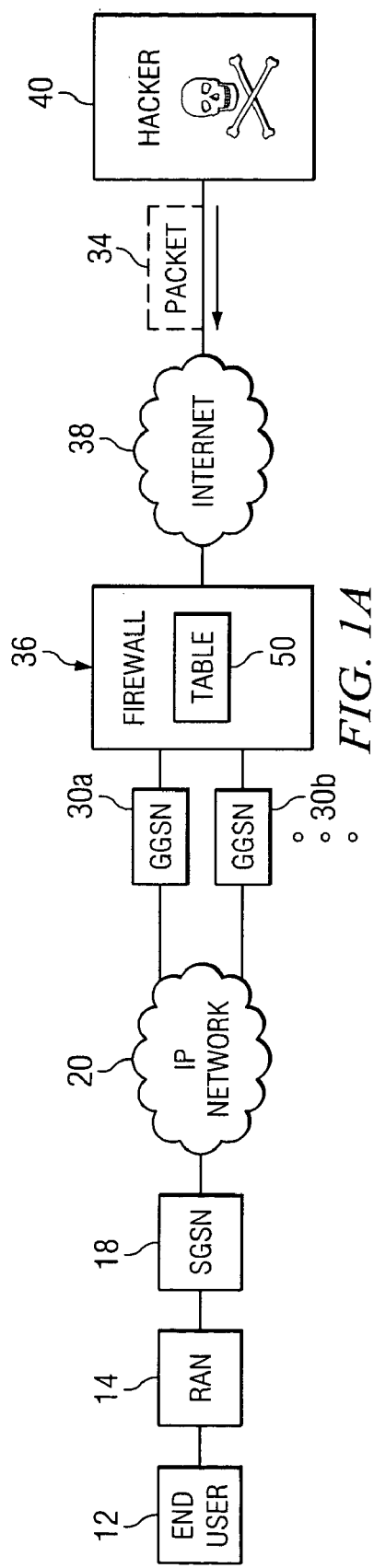
FIG. 1A is a simplified block diagram of a communication system for providing security in a network environment in accordance with one embodiment of the present invention.

FIG. 1A is a simplified block diagram of a communication system 10 for communicating data in a network environment. Communication system 10 may include an end user 12, a radio access network (RAN) 14, a serving general packet radio service (GPRS) support node (SGSN) 18, and an internet protocol (IP) network 20. Additionally, communication system 10 may include a firewall 36 (that may include a table 50) and multiple gateway GPRS support nodes (GGSNs) 30*a-b*. Communication system 10 may also include an Internet 38 and a hacker 40, who may be initiating a malicious packet 34.

FIG. 1A may be generally configured or arranged to represent a 2.5 G communication architecture applicable to a Global System for Mobile (GSM) environment in accordance with a particular embodiment of the present invention. However, the 2.5 G architecture is offered for purposes of example only and may alternatively be substituted with any suitable networking protocol or arrangement that provides a communicative platform for communication system 10. For example, communication system 10 may cooperate with any version of a GPRS tunneling protocol (GTP) that includes loadbalancing operations. This may be inclusive of first generation, 2 G, and 3 G architectures that provide features for workload distribution.

In order to understand the extent of the teachings of communication system 10, it is useful to offer some overview as to the way in which user connections are generally managed. This description is offered for purposes of example only and should not be construed in any way to limit the principles, characteristics, and features of the present invention. The following explanation is provided in the context of a firewall, but such an example is equally applicable to any other network element that poses the described security concern.

Firewalls generally operate independently, whereby they learn the connections and learn about the flows that are propagating through them. Because of such operations, firewalls generally maintain certain flows during periods of inactivity. As is evident, there is an inherent limitation in such a model. This is a result of a time interval that is provided in which a firewall is holding onto information that is no longer valid. The firewall then learns new information such that it includes current information, but such a process does not happen instantaneously; it takes a certain time interval to update this information. Hacker 40 may exploit this small window of time to his advantage.

Thus, in an example architecture, consider a GPRS/universal mobile telecommunication system (UMTS) data network where mobile users frequently connect and disconnect to the GPRS/UMTS service. Due to this frequent connection/disconnection, different users may be allocated the same IP address. Hence, the same IP address can be used by user X, and in a very short period, the same IP address may be used by user Y. The corresponding firewall for this system may attempt to keep track of user sessions dynamically, whereby a period of inactivity on a certain session will eventually clear the dynamically created entries on a firewall. Malicious users (e.g. hacker 40) may take advantage of this situation and send malicious packets that cause security issues, over-billing issues, etc.

Communication system 10 addresses this issue by allowing firewall 36 to immediately or quickly synchronize session state information once end user 12 is disconnected from the given network. Communication system 10 may capitalize on the knowledge of a given access gateway, such as the knowledge maintained by GGSNs 30*a* and 30*b*. GGSNs 30*a* and 30*b* may keep track of any events involving end user 12, for example: the IP address of end user 12, when end user 12 is on the network, or when end user 12 is disconnected from the network (i.e. a specific IP address is no longer in use). The events could also include other relevant end user parameters, such as: when accounting is started (when the IP address is assigned), when accounting is stopped, or any other authentication, authorization, and accounting (AAA) characteristic of interest to firewall 36. The events, as they occur, may be communicated to firewall 36 such that its internal table 50 can be immediately updated. Therefore, firewall 36 does not need to idle or stagnate for a period of time, or maintain information that is no longer accurate.

It is the behavior of hacker 40 that can pose a security concern or an integrity issue in the network. Any number of strategies may be employed by hacker 40 in attempting to break into a communication session or attack a given end user 12 or network element. Hacker 40 may use techniques to corrupt network communications, skew billing records, infiltrate network participants, or compromise the integrity of network traffic.

Communication system 10 avoids such hacker problems and issues and offers a security feature that provides optimal communications between end user 12 and selected GGSNs 30*a-b*. Communication system 10 solves the security gap by synchronizing the access gateway (e.g. GGSNs 30*a* and 30*b*) and firewall 36. The assigned GGSN is the component that is aware of user sessions and their associated IP address. A firewall is the device providing security to the network, but it is generally unaware of user sessions and IP addresses. The firewall would normally build state information based on connection requests and responses.

Firewall 36 of communication system 10 may behave in a different manner. The assigned GGSN may indicate to firewall 36 the start and stop events of user sessions, as well as the corresponding IP address. For example, an accounting STOP indicator allows firewall 36 to clear any sessions with the associated IP address. An accounting START indicator communicated to firewall 36 can be used to setup certain additional policies associated with a user, as well as clearing any prior state information. This allows firewall 36 to protect the network dynamically and to avoid un-solicited packets being received. Communication system 10 may use a protocol between the GGSN and firewall 36, allowing a standard GGSN to synchronize with firewall 36. Note that such a protocol is 'protocol independent' and provides dynamic security without any user-initiated packets to be sent. In addition, such a configuration can be extended to cover any access gateways and network elements, as explained more fully below with reference to FIG. 1B.

End user 12 is a client or a customer wishing to initiate a communication in communication system 10 via IP network 20. End user 12 may be inclusive of devices used to initiate a communication, such as a computer, a personal digital assistant (PDA), a laptop or an electronic notebook, a telephone, a mobile station, or any other device, component, element, or object capable of initiating voice or data exchanges within communication system 10. End user 12 may also be inclusive of a suitable interface to the human user, such as a microphone, a display, a keyboard, or other terminal equipment (such as for example an interface to a personal computer or to a facsimile machine in cases where end user 12 is used as a modem). End user 12 may also be any device that seeks to initiate a communication on behalf of another entity or element, such as a program, a database, or any other component, device, element, or object capable of initiating a voice or a data exchange within communication system 10. Data, as used herein in this document, refers to any type of numeric, voice, video, audio-visual, or script data, or any type of source or object code, or any other suitable information in any appropriate format that may be communicated from one point to another.

RAN 14 is a communications interface between end user 12 and SGSN 18. RAN 14 may comprise a base transceiver station and a base station controller. The communications interface provided by RAN 14 offers connectivity and allows data to be exchanged between end user 12 and any number of selected elements within communication system 10. RAN 14 facilitates the delivery of a request packet generated by end user 12 and the reception of information sought by end user 12. RAN 14 is only one example of a communications interface between end user 12 and SGSN 18. Other types of communications interfaces may be used for a desired network design based on particular needs.

IP network 20 represents a series of points or nodes of interconnected communication paths for receiving and transmitting packets of information that propagate through communication system 10. IP network 20 offers a communicative interface between end user 12 and selected GGSNs 30*a-b* and may be any local area network (LAN), wireless local area network (WLAN), metropolitan area network (MAN), wide area network (WAN), virtual private network (VPN), or any other appropriate architecture or system that facilitates communications in a network environment. IP network 20 implements a user datagram protocol (UDP)/internet protocol (UDP/IP) communication language protocol in a particular embodiment of the present invention. However, IP network 20 may alternatively implement any other suitable communication protocol for transmitting and receiving data or information within communication system 10.

SGSN 18 and GGSNs 30*a-b* are network elements that cooperate in order to facilitate a communication session involving end user 12. GGSNs 30*a-b* are network nodes that may be working in conjunction with multiple SGSNs 18 to provide a communications medium in a GPRS service network environment in communicating data exchanges within communication system 10. GPRS represents a packet-based data bearer service for communication services that may be delivered as a network overlay for any type of suitable network configuration or platform. GPRS generally applies packet-radio and packet switching principles to transfer data packets in an efficient way between GSM elements or units and external packet data networks. GPRS may support multiple internet communication protocols and may enable existing IP, X.25, or any other suitable applications or platforms to operate over GSM connections. It is imperative to note that GGSNs 30*a* and 30*b* and SGSN 18 may be easily replaced with any components that offer a communicative interface to end user 12. Any generic access gateway may readily adopt the teachings of the present invention. Moreover, any network devices that provide some form of connectivity to end user 12 may be used in conjunction with firewall 36.

Hacker 40 represents an entity that seeks to disturb normal communications in communication system 10 by exploiting vulnerable time gaps in a given network architecture. Hacker 40 may communicate packets (e.g. packet 34) that proclaim to originate from somewhere other than where they actually originated. Such a procedure is generally referred to as spoofing and may be used by hacker 40 in order to wreak havoc in a network environment. Hacker 40 may be any element, device, component, or object that seeks to misrepresent the accurate source of packet 34. In addition, hacker 40 may misuse an IP address, which was previously allocated to end user 12. Thus, packet 34 may be communicated under the guise or pretext that it originated from end user 12 when, in fact, it was sent by hacker 40. Additionally, hacker 40 may be representative of any protocol, process, operation, virus, worm, Trojan, or element that seeks to imitate an entity or to confuse an entity in the context of network communications. Hacker 40 may also represent other elements, objects, or entities that seek to disrupt or disturb proper network communications in communication system 10. Hacker 40 may include any suitable algorithm, hardware, software, component, device, object, or element that effectuates its operations.

Firewall 36 is a piece of network equipment that is capable of evaluating or inspecting a packet (or an entire communication flow) in order to determine if the information is valid, the information is in its proper format, and/or the information is being rerouted to an appropriate next destination. Firewall 36 may be coupled to GGSNs 30*a* and 30*b* and may operate to discard, delete, or otherwise avoid damaging data segments sought to be communicated to any element or device within communication system 10. Firewall 36 is a system architecture that enforces an access control policy between two nodes, such as a virtual private network (VPN) and a public node, such as Internet 38.

Firewall 36 may include table 50 as well as software that allows it to listen to (or glean information from) a given set of flows in accordance with the teachings of the present invention. Note that as used herein in this document, the term 'glean' (in the context of information associated with end user 12) includes [but is not limited to] learning, identifying, recognizing, listening to, watching, or otherwise monitoring. Alternatively, this gleaning capability may be provided in any suitable hardware, random access memory (RAM), application specific integrated circuit (ASIC), algorithm, read-only memory (ROM), erasable programmable ROM (EPROM), electronically EPROM (EEPROM), or in any appropriate combination thereof or in any other suitable component, device, element or object operable to provide such gleaning capabilities and functions. Additional details related to table 50 are provided below in conjunction with FIG. 2.

In operation of an example embodiment, communication system 10 may simply leverage RADIUS (or any other existing protocol) in updating the internal information of firewall 36. Firewall 36 generally includes table 50 that includes information associated with flows. In this example, firewall 36 can listen to or otherwise monitor events (via a corresponding GGSN) such that it can identify the corresponding IP address and then clear or remove all internal flows that it has built for that IP address (e.g. in the context of an accounting STOP indicator). Similarly, firewall 36 can identify an accounting START event and clean up any outdated flows (if any exist) in table 50.

Internet 38 represents a public internet that offers a communicative interface for GGSNs 30*a* and 30*b* to direct information to mobile terminals 12*a* and 12*b* and may be any LAN, WLAN, MAN, WAN, VPN, Intranet or any other appropriate architecture or system that facilitates communications in a network environment. Internet 38 implements a UDP/IP communication language protocol in a particular embodiment of the present invention. However, Internet 38 may alternatively implement any other suitable communication protocol for transmitting and receiving data or information within communication system 10. Additionally, Internet 38 may interface with any additional element or object in order to facilitate proper data management where appropriate and based on particular needs.

Figure 1B:
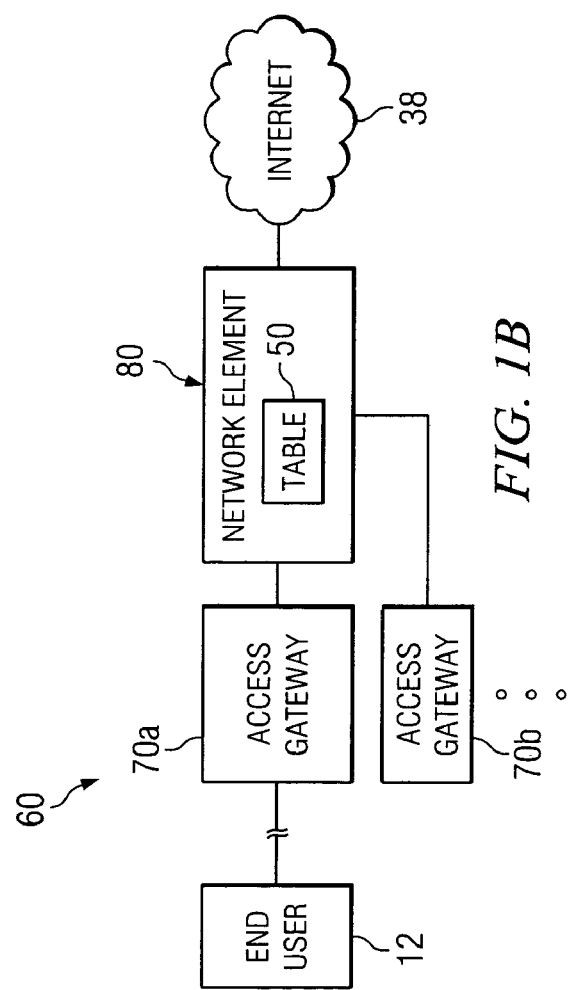
FIG. 1B is a simplified block diagram of an alternative embodiment of the communication system.

FIG. 1B is a simplified block diagram of an alternative embodiment of the present invention. FIG. 1B illustrates a generic system 60 that operates in a similar manner as that of communication system 10. FIG. 1B includes a set of generic access gateways 70*a* and 70*b* and a network element 80, which includes table 50. Because communication system 10 may be extended to any scenario in which end user 12 is provided with connectivity (in the context of a wired or a wireless connection or coupling), end user 12 may use any type of generic access gateway (e.g. access gateways 70*a* or 70*b*). For example, access gateways 70*a* and 70*b* may be a network access server (NAS), foreign agents, or any other suitable interface that offers some connectivity to end user 12. End user 12 may use a dedicated connection of some form or use forms of multiple access protocols where appropriate. Access may be associated with, for example, point-to-point protocol (PPP) or alternatively with layer three protocols over an L2 layer in accordance with particular needs. Such an embodiment may include any suitable tunnel terminators and/or tunnel initiators that may be operable to communicate with firewall 36. Other protocols may also be readily accommodated.

It is imperative to note that generic system 60 is broad and expansive and, therefore, could readily accommodate any number of access gateways, whereby the access gateways can assign IP addresses and provide general subscriber management functions. Accordingly, generic system 60 may be applicable to any wireless technology, broadband architecture, or any other configuration where security presents an issue.

Moreover, network element 80 is considerably flexible in that any suitable network device may be positioned in its place in order to achieve the teachings of the present invention. For example, network element 80 may be a firewall (as illustrated in FIG. 1A), a router, a switch, a loadbalancer, a processor, a bridge, a gateway, or any other suitable element operable to perform some processing or routing operation for an incoming packet. The use of a firewall in FIG. 1A has been offered for purposes of example only in the context of one application that involves security measures. Other applications may readily include instances where some other device is used.

In operation of an example embodiment of generic system 60, access gateway 70a may provide connectivity to Internet 38 for end user 12. Between these two elements is network element 80, which operates to protect end user 12 from malicious traffic, breaches in security, false denial of service messages, etc. However, because of the small gap in time that is normally present in such a network configuration as identified above, the gap offers a loophole for hacker 40 (or any other entity) to wreak havoc on the system. Thus, network element 80 is configured much like firewall 36 to be able to synchronize with a corresponding access gateway 70a or 70b. This may be achieved by network element 80 gleaning information associated with events that involve end user 12 and then updating its table 50.

Figures 2, 3:
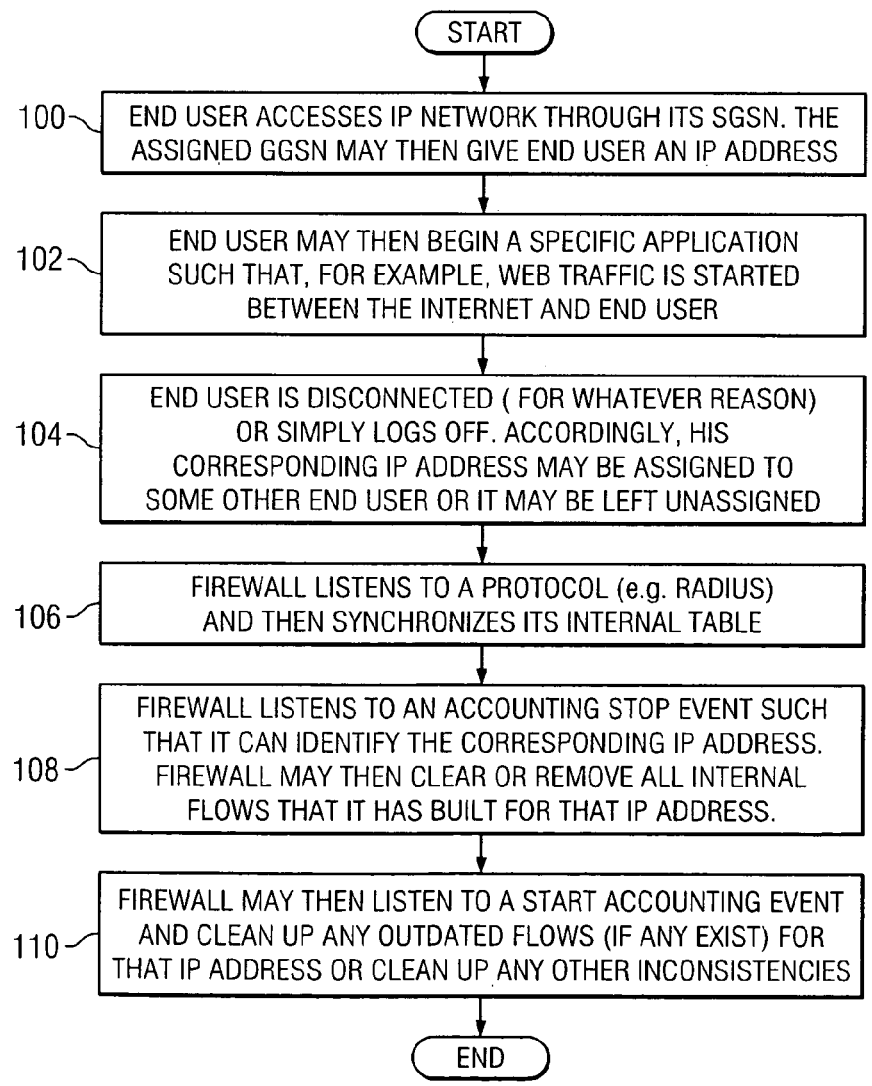
FIG. 2 is a simplified block diagram of a table that may be included within a network element that is provided in the communication system.
FIG. 3 is a flowchart illustrating a series of example steps associated with a method for providing security in a network environment.

FIG. 2 is a simplified block diagram illustrating table 50 in an example implementation of either communication system 10 or generic system 60. Table 50 may be stored within, or provided external to, firewall 36 and/or network element 80. Table 50 may include any suitable software, hardware, RAM, ASIC, algorithm, ROM, EPROM, EEPROM, or in any other suitable component, device, element or object where appropriate and based on particular needs. Table 50 may be readily replaced with a database or any other suitable memory element operable to store end user information (e.g. relating to sessions, flows, connections, etc.).

As illustrated in FIG. 2, table 50 may include any number of data segments associated with session objects, end users, or flows. In one example implementation, table 50 includes an end user column, an IP address column (for the corresponding end users), a quality of service (QoS) type column, a date/time column, and a miscellaneous column. Such categories of information are not exhaustive and may certainly be added to, deleted, or restricted and/or changed significantly. The categories of information have been provided for purposes of example only and should be construed as such.

Table 50 may alternatively include (and be indexed by) any other suitable information pertinent to communication sessions or flows propagating in communication system 10. For example, table 50 may include policy/profile/subscription information, destination IP address, protocol, source and destination ports, or capability characteristics of devices being employed by end user 12. Table 50 may be suitably updated by firewall 36 and/or network element 80 with information that is provided by RADIUS flows such that it is synchronized with its corresponding access gateway.

FIG. 3 is a simplified flowchart illustrating a series of example steps associated with a method for providing security in a network environment. The method may begin at step 100 where end user 12 accesses IP network 20 through its SGSN 18. Subsequently, GGSN 30a (its assigned GGSN) may then give end user 12 an IP address. In this example configuration, end user 12 has been assigned an IP address of 'A' with a corresponding port 'B.' End user 12 may then begin a specific application such that, for example, web traffic is started between Internet 38 and end user 12 at step 102. Thus, a certain flow has been started that propagates through firewall 36.

At step 104, end user 12 is disconnected from (for whatever reason) or simply logs off the network. Accordingly, his corresponding IP address 'A' may be assigned to some other end user or it may be left unassigned. Note that this is the vulnerable point in a given system where hacker 40 may take advantage of this time gap by communicating malicious traffic in communication system 10 using IP address 'A' and/or port 'B.' Moreover, hacker 40 could corrupt other end user's traffic or sessions by using this single connection as an entry point into the system. This could be frustrating for a service provider who is attempting to bill for data that (ostensibly) is being provided to end user 12. End user 12 is also frustrated because he is being charged for data that he neither received nor authorized. This inconsistency in billing further creates additional overhead for a service provider in attempting to figure out what went wrong in the network.

Firewall 36 avoids this problem by gleaning information from a protocol (e.g. RADIUS) such that events from the access gateway (e.g. GGSN 30a or 30b) are synchronized to its internal table 50. This is illustrated in step 106. In this example scenario, firewall 36 listens to an accounting STOP event such that it can identify the corresponding IP address. Firewall 36 may then clear or remove all internal flows that it has built for that IP address at step 108. In addition, firewall 36 may then listen to (or otherwise identify) a START accounting event and clean up any outdated flows (if any exist) for that IP address (or clean up any other consistencies) at step 110. This process may continue such that firewall 36 has a current and synchronized table 50 and, further, that the above-identified security gap is closed.

Some of the steps illustrated in FIG. 3 may be changed or deleted where appropriate and additional steps may also be added to the flowchart. These changes may be based on specific communication architectures or particular interfacing arrangements and configurations of associated elements and do not depart from the scope or the teachings of the present invention.

Although the present invention has been described in detail with reference to IP communications, communication system 10 may be used for any tunneling protocol involving user requests in an environment where security is an issue. Any suitable communications that involve a network node or an access gateway that facilitates end user communications may benefit from the teachings of the present invention. The use of end user 12 and IP communications have only been offered for purposes of teaching and should not be construed to limit the scope of the present invention in any way.

Moreover, although communication system 10 has been illustrated with reference to particular protocols facilitating the proposed process, these elements may be replaced by any suitable architecture or configuration that achieves the intended functionality of communication system 10 or generic system 60. For example, any suitable communicative platforms may be used to effectuate the operations that provide information to firewall 36 or network element 80. Firewall 36 and/or network element 80 may utilize information via any suitable backend control protocol (e.g. GTP', RADIUS, DIAMETER, terminal access controller access system (TACACS), etc.). Such alternatives are clearly within the broad scope of communication system 10.

Numerous other changes, substitutions, variations, alterations, and modifications may be ascertained to one skilled in the art and it is intended that the present invention encompass all such changes, substitutions, variations, alterations, and modifications as falling within the spirit and scope of the appended claims. In order to assist the United States Patent and Trademark Office (USPTO) and additionally any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of filing hereof unless the words "means for" are specifically used in the particular claims; and (b) does not intend by any statement in the specification to limit his invention in any way that is not otherwise reflected in the appended claims.

What is claimed is:

1. An apparatus for providing security in a network environment, comprising:
a network element operable to:
receive a flow that propagates through an access gateway, the flow associated with an end user and propagating through a network, the flow communicating an accounting START indicator and an accounting STOP indicator, the accounting START indicator indicating that accounting has started, the accounting STOP indicator indicating that accounting has stopped;
glean internet protocol (IP) address information from the flow, the IP address information comprising an IP address;
determine from the accounting START indicator that the end user is being connected to the network;
remove an outdated flow for the IP address from a table and insert the flow in place of the outdated flow in the table in response to the determination from the accounting START indicator;
determine from the accounting STOP indicator that the end user is being disconnected from the network; and
remove the flow from the table in response to the determination from the accounting STOP indicator such that the IP address information in the access gateway and the network element is synchronized independent of a connection request or a connection response, wherein the access gateway is a general packet radio gateway service (GPRS) support node (GGSN) and the network element is a firewall.

2. The apparatus of claim 1, wherein the table stores the IP address information associated with the end user.

3. The apparatus of claim 1, wherein the network element identifies the accounting START indicator associated with the end user and responds by providing an entry in the table and by removing existing information in the table that is inconsistent with the accounting START indicator being provided for the end user.

4. The apparatus of claim 1, wherein the network element identifies the accounting STOP indicator associated with the end user and responds by deleting an entry in the table and by removing existing information in the table that is inconsistent with the accounting STOP indicator being provided for the end user.

5. The apparatus of claim 1, wherein the network element is operable to use a selected protocol to glean the IP information, the selected protocol being included in a group of protocols consisting of:
a) RADIUS;
b) TACACS; and
c) DIAMETER.

6. A method for providing security in a network environment, comprising:
receiving a flow that propagates through an access gateway, the flow associated with an end user and propagating through a network, the flow communicating an accounting START indicator and an accounting STOP indicator, the accounting START indicator indicating that accounting has started, the accounting STOP indicator indicating that accounting has stopped;
gleaning internet protocol (IP) address information from the flow at a network element, the IP address information comprising an IP address;
determining from the accounting START indicator that the end user is being connected to the network;
removing an outdated flow for the IP address from a table and inserting the flow in place of the outdated flow in the table in response to the determination from the accounting START indicator;
determining from the accounting STOP indicator that the end user is being disconnected from the network; and
removing the flow from the table in response to the determination from the accounting STOP indicator such that the IP address information in the access gateway and the network element is synchronized independent of a connection request or a connection response, wherein the access gateway is a general packet radio gateway service (GPRS) support node (GGSN) and the network element is a firewall.

7. The method of claim 6, the table storing the IP address information associated with the end user.

8. The method of claim 6, further comprising:
identifying the accounting START indicator associated with the end user; and responding to the accounting START indicator by providing an entry in the table and by removing existing information in the table that is inconsistent with the accounting START indicator being provided for the end user.

9. The method of claim 6, further comprising:
identifying the accounting STOP indicator associated with the end user; and responding to the STOP indicator by deleting an entry in the table and by removing existing information in the table that is inconsistent with the accounting STOP indicator being provided for the end user.

10. A system for providing security in a network environment, comprising:
means for receiving a flow that propagates through an access gateway, the flow associated with an end user and propagating through a network, the flow communicating an accounting START indicator and an accounting STOP indicator, the accounting START indicator indicating that accounting has started, the accounting STOP indicator indicating that accounting has stopped;

means for gleaning interne protocol (IP) address information from the flow at a network element, the IP address information comprising an IP address;

means for determining from the accounting START indicator that the end user is being connected to the network;

means for removing an outdated flow for the IP address from a table and inserting the flow in place of the outdated flow in the table in response to the determination from the accounting START indicator;

means for determining from the accounting STOP indicator that the end user is being disconnected from the network; and means for removing the flow from the table in response to the determination from the accounting STOP indicator such that the IP address information in the access gateway and the network element is synchronized independent of a connection request or a connection response, wherein the access gateway is a general packet radio gateway service (GPRS) support node (GGSN) and the network element is a firewall.

11. The system of claim 10, the table storing the IP address information associated with the end user.

12. The system of claim 10, further comprising:

means for identifying the accounting START indicator associated with the end user; and means for responding to the accounting START indicator by providing an entry in the table and by removing existing information in the table that is inconsistent with the accounting START indicator being provided for the end user.

13. The system of claim 10, further comprising:

means for identifying the accounting STOP indicator associated with the end user; and means for responding to the STOP indicator by deleting an entry in the table and by removing existing information in the table that is inconsistent with the accounting STOP indicator being provided for the end user.

14. Software for providing security in a network environment, the software being embodied in a non-transitory computer readable medium and including computer code such that when executed is operable to:

receive a flow that propagates through an access gateway, the flow associated with an end user and propagating through a network, the flow communicating an accounting START indicator and an accounting STOP indicator, the accounting START indicator indicating that accounting has started, the accounting STOP indicator indicating that accounting has stopped;

glean internet protocol (IP) address information from the flow at a network element, the IP address information comprising an IP address;

determine from the accounting START indicator that the end user is being connected to the network;

remove an outdated flow for the IP address from a table and insert the flow in place of the outdated flow in the table in response to the determination from the accounting START indicator;

determine from the accounting STOP indicator that the end user is being disconnected from the network; and remove the flow from the table in response to the determination from the accounting STOP indicator such that the IP address information in the access gateway and the network element is synchronized independent of a connection request or a connection response, wherein the access gateway is a general packet radio gateway service (GPRS) support node (GGSN) and the network element is a firewall.

15. The medium of claim 14, the table storing the IP address information associated with the end user.

16. The medium of claim 14, wherein the code is further operable to:

identify the accounting START indicator associated with the end user; and respond to the accounting START indicator by providing an entry in the table and by removing existing information in the table that is inconsistent with the accounting START indicator being provided for the end user.

17. The medium of claim 14, wherein the code is further operable to:

identify the accounting STOP indicator associated with the end user; and respond to the STOP indicator by deleting an entry in the table and by removing existing information in the table that is inconsistent with the accounting STOP indicator being provided for the end user.

18. The apparatus of claim 1, wherein the network element is further operable to manage the table, the table being associated with the network element, the table identifying a plurality of end users and an accounting indicator associated with each of the plurality of end users.

19. The method of claim 6, further comprising managing the table, the table being associated with the network element, the table identifying a plurality of end users and an accounting indicator associated with each of the plurality of end users.

20. The system of claim 10, further comprising means for managing the table, the table being associated with the network element, the table identifying a plurality of end users and an accounting indicator associated with each of the plurality of end users.

21. The medium of claim 14, wherein the code is further operable to manage the table, the table being associated with the network element, the table identifying a plurality of end users and an accounting indicator associated with each of the plurality of end users.

* * * * *